April 30, 1935.  T. MARTIN  1,999,817
VEGETABLE WASHER
Filed May 9, 1932
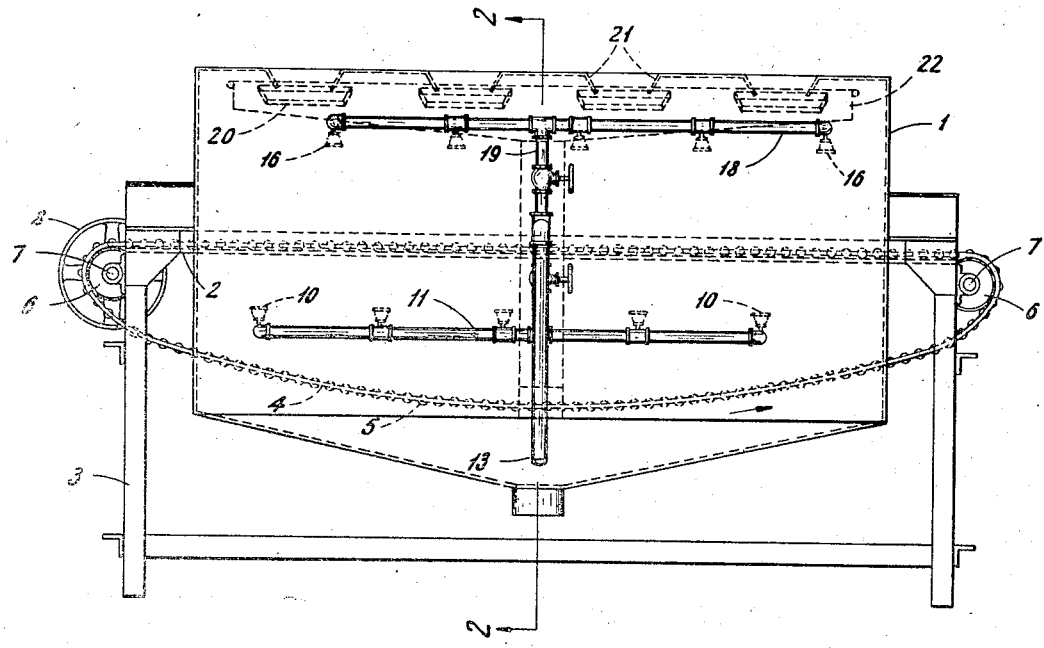
Fig_1.
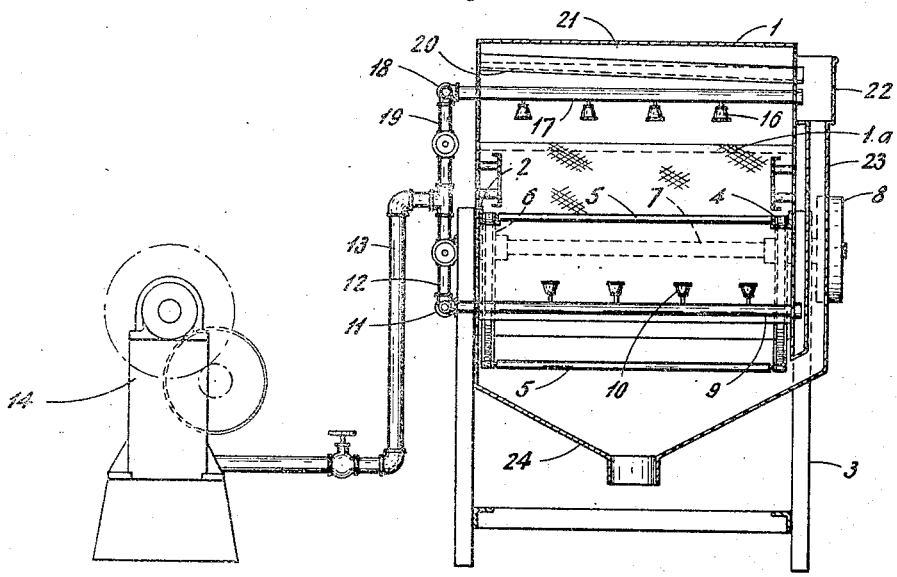
Fig_2.
INVENTOR.
Thomas Martin.
BY Philip A. Minnis
ATTORNEY.

Patented Apr. 30, 1935

1,999,817

UNITED STATES PATENT OFFICE 1,999,817

VEGETABLE WASHER

Thomas Martin, Hoopeston, Ill., assignor to Food Machinery Corporation, San Jose, Calif., a corporation of Delaware Application May 9, 1932, Serial No. 610,071

6 Claims. (Cl. 146—194)

This invention relates to vegetable washing apparatus and more particularly to apparatus especially designed for washing and cleaning such vegetables as green corn on the cob.

In the process of preparing corn for canning, and preliminary to cutting the kernels from the cob, the ears are first husked and then washed and the tassel silks and worm eaten kernels removed. It has been found that this may be done quite effectively by subjecting the husked ears of corn to the action of high pressure sprays, and apparatus for this purpose may comprise, in general, a washing chamber through which the ears are carried by a conveyor passing over a series of upwardly directed high pressure spray jets.

In the operation of such machines a considerable quantity of silks, pieces of kernels, and bits of husks removed by the spray jets are thrown against the ceiling of the washing chamber where it adheres until the accumulation is so great that it falls back upon the corn passing through the chamber and interferes with the cleaning. To prevent this it is necessary to interrupt the operation of the washer at intervals and clean out this accumulation of debris adhering to the ceiling of the washing chamber.

It is the principal object of this invention to provide a washing apparatus which shall be continuously self cleaning during its operation, thereby insuring that the efficiency of the washing operation shall not be interfered with and avoiding the necessity of frequent interruptions for cleaning.

A further object is to provide a washing apparatus in which means is disposed adjacent the ceiling of the washing chamber for catching and disposing of any debris thrown upwardly by the spray jets, whereby the apparatus is self cleaning.

Further objects and advantages will become apparent by reference to the accompanying drawing, in which:

Figure 1 is a side elevation of one form of apparatus embodying the invention.

Figure 2 is a sectional view taken along the line 2—2 of Figure 1.

The apparatus illustrated comprises a housing 1 supported by suitable angle iron frame members 2 and the whole is supported by legs 3. The upper and working run of an endless conveyor, made up of the endless side chains 4 interconnected by a plurality of spaced roller cross rods 5, extends longitudinally through the housing and is supported by sprockets 6 at each end of the machine around which the chains are passed. The sprockets 6 are secured to shafts 7 journaled in suitable bearings, and power for operating the conveyor may be supplied to one of these shafts by means of a pulley 8. Sagging of the upper runs of the conveyor chains is prevented by the frame members 2 which are positioned beneath the chains as shown so as to provide for their support. Preferably, the inlet and discharge openings, through which the corn is introduced and removed, are provided with flexible curtains 1a, as best shown in Figure 2.

Arranged within the housing and below the upper run of the conveyor are a plurality of transverse pipes 9 provided with upwardly directed spray nozzles 10 designed to project high pressure jets of washing liquid against the ears of corn or other vegetables resting on the conveyor. The pipes 9 are interconnected by means of a longitudinal main 11, which is supplied with washing liquid through pipes 12 and 13 from a pump 14.

The pump 14 is designed to deliver washing liquid to the spray nozzles 10 under sufficiently high pressure so that the jets of washing liquid impinge against the ears of corn carried by the conveyor with sufficient force to remove worm eaten and decayed kernels and penetrate between the rows of kernels on the corn to remove the silks therefrom. For example, I have found that by positioning the nozzles 10 approximately six inches below the conveyor, pressures ranging from 275 pounds per square inch to 375 pounds per square inch give very satisfactory results.

Preferably, also, the liquid pressure should be such that the spray jets have sufficient force to lift the ears of corn free of the conveyor momentarily as they pass over the jets. The pressure required for the accomplishment of this purpose is preferably determined by trial in each case, since it is obviously dependent upon the size of the nozzles and their proximity to the conveyor. As may be seen, when the ears are thus momentarily lifted free of the conveyor they have a tendency to rotate somewhat so that a larger surface of the corn is subjected to the action of the washing liquid than would be the case if low pressure sprays were used which would permit the ears to remain stationary relative to the conveyor. Moreover, by causing the ears to be thus rotated by each set of jets, it is insured that the several jets will have an opportunity of acting against all sides of the corn. If desired, the nozzles may be slightly canted in a forward direction to assist in the advancement of the ears.

A second series of spray nozzles 16 is arranged above the conveyor to assist in the washing, these nozzles being fed by transverse pipes 17 interconnected by the main 18 and receiving washing liquid from the pipe 13 by means of the pipe 19. The pipes 17 are staggered with respect to the lower pipes so that the spray jets issuing from the nozzles 16 will not interfere with the action of the lower jets, and the nozzles 16 are also preferably staggered relative to the nozzles 10 so that no portions of the vegetables on the conveyor shall escape the action of the washing liquid.

In the operation of the apparatus thus far described it will be seen that as the ears of corn are passed over the upwardly directed spray jets the defective kernels, silks, and any bits of husk not previously removed from the ears, are thrown upwardly with considerable force against the ceiling of the housing, to which they adhere, and unless some means is provided for their removal they accumulate there until the weight of the accumulated mass causes it to fall back upon the conveyor and interfere with the cleaning operation.

To overcome this and make the apparatus self cleaning, there are provided a series of troughs 20 arranged adjacent the ceiling, which is slit at several points and portions thereof bent downwardly as shown to provide deflecting members 21 for deflecting liquid and debris into the troughs. The transverse troughs 20 discharge into a longitudinal trough 22 secured to the outside of the housing which discharges through a pipe 23 into the drip pan 24.

In operation, the high pressure sprays create a considerable air pressure within the housing 1, and this pressure escaping through the openings in the top of the housing causes a vigorous draft upwardly against the housing ceiling and downwardly beneath the deflectors 21 whereby liquid and debris thrown against the under portions of the troughs 20 and the housing ceiling is swept toward the passages between the edges of the troughs and the deflecting members 21 and then downwardly into the several troughs from whence it is discharged into the pipes 23 and the drip pan 24. The result is that the debris thrown upwardly by the spray jets against the housing ceiling or the undersides of the troughs 20 does not accumulate there, but is forced into the troughs and discharged from the apparatus.

Although the operation of the apparatus disclosed has been described in connection with the cleaning of ear corn, it will be apparent that its usefulness is not limited thereto but it may be used to wash other articles as well.

Having now described my invention and in what manner the same may be used, what I claim as new and desire to protect by Letters Patent is:

1. In a vegetable washer, a housing, a conveyor for conveying vegetables through the housing, means below the conveyor for discharging jets of liquid upwardly onto vegetables being conveyed, a plurality of troughs disposed adjacent the ceiling of the housing, means for deflecting liquid and debris thrown by said jets onto the housing ceiling into said troughs, and means communicating with said troughs for draining the same.

2. In a vegetable washer, a housing, a conveyor for conveying vegetables through the housing, means below the conveyor for discharging jets of liquid upwardly onto vegetables being conveyed, a drip pan arranged below said liquid discharge means, a plurality of troughs disposed adjacent the ceiling of the housing, means for deflecting liquid and debris thrown by said jets onto the housing ceiling into said troughs, and means for directing the discharge from the troughs into the drip pan.

3. In a vegetable washer, a housing, a conveyor for conveying vegetables through the housing, means below the conveyor for discharging high pressure jets of liquid upwardly onto vegetables being conveyed, and means adjacent the ceiling of the housing for receiving and discharging from the housing liquid and debris thrown onto the ceiling by said jets, said ceiling being provided with openings above said receiving means whereby to create a draft of air therethrough to assist in depositing liquid and debris in the receiving means.

4. In a vegetable washer, a housing, a conveyor for conveying vegetables therethrough, means below the housing for discharging jets of liquid upwardly onto vegetables being conveyed, the ceiling of said housing having slits therein and portions adjacent said slits bent downwardly to provide deflecting surfaces within the housing, and means extending beneath said slits and deflecting surfaces for receiving and discharging from the housing liquid and debris thrown onto the ceiling by said jets and deflected into the receiving means.

5. In a vegetable washer, a housing, a conveyer for conveying vegetables through the housing, means below the conveyer for discharging jets of liquid upwardly onto vegetables being conveyed, trough means adjacent the ceiling of the housing for receiving liquid and debris thrown upwardly by said jets, and means communicating with said trough means for draining the same, said ceiling being provided with openings above said trough means whereby to create a draught of air therethrough to assist in depositing liquid and debris in the trough means.

6. In a vegetable washer, a housing, a conveyer for conveying vegetables therethrough, means below the conveyer for discharging jets of liquid upwardly onto vegetables being conveyed, trough means adjacent the ceiling of the housing for receiving liquid and debris thrown upwardly by said jets, means communicating with said trough means for draining the same, and deflecting members disposed adjacent the ceiling of the housing and cooperating with said trough means for deflecting liquid and debris thrown upwardly by said jets into said trough means.

THOMAS MARTIN.